Patented Aug. 16, 1927.

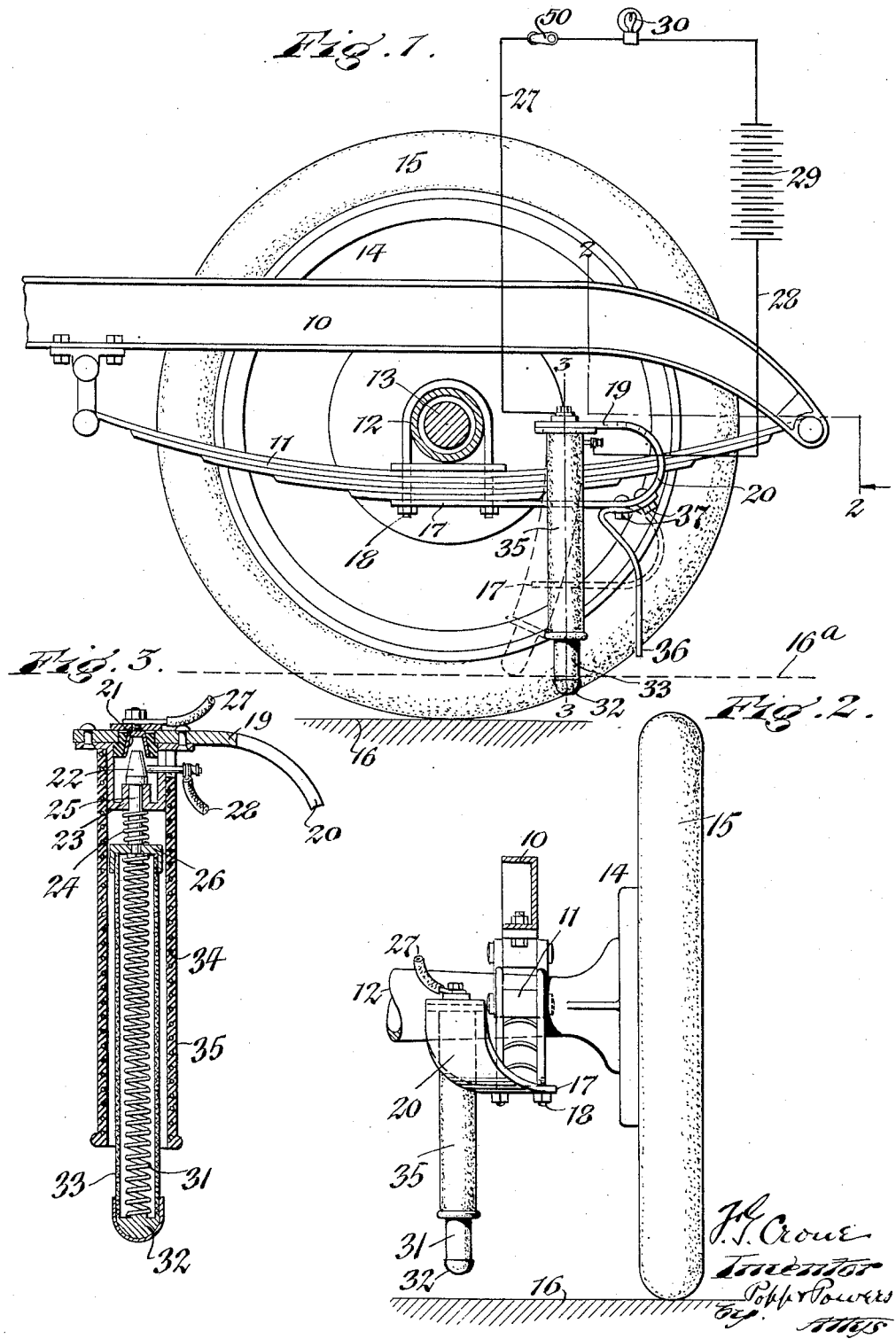

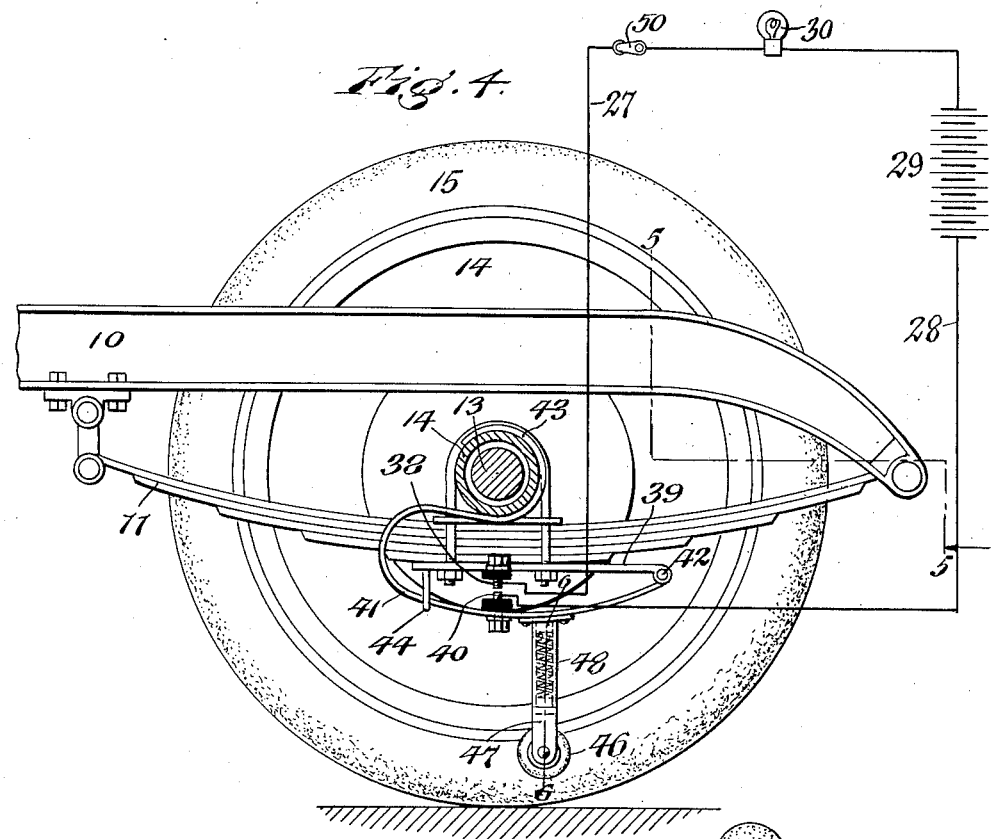
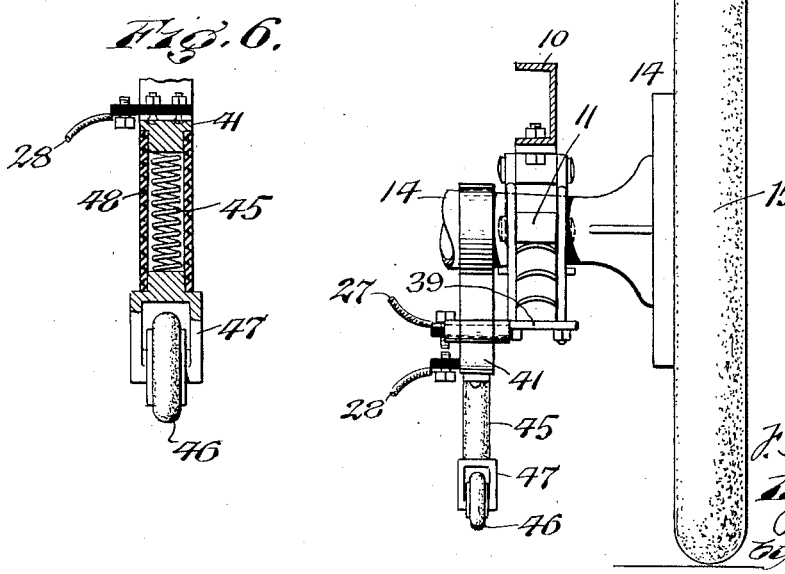

1,638,983

UNITED STATES PATENT OFFICE.

FRANCIS G. CRONE, OF BUFFALO, NEW YORK.

TIRE-DEFLATION INDICATOR.

Application filed April 6, 1926. Serial No. 100,079.

This invention relates to means whereby a signal will be given to the attendant of an automobile when a tire on the same has become deflated by reason of a puncture or otherwise and thus enables him to either re-inflate the tire or make the necessary repair before the shoe and inner tube, or either of them have become injured to any considerable extent.

It is the object of this invention to provide a tire deflation indicator which will accomplish this purpose effectively, which can be easily applied to cars of various makes and which is not liable to get out of order.

In the accompanying drawings:—

Figure 1, is a fragmentary vertical longitudinal section of the chassis of an automobile showing the same equipped with one form of my improved tire deflation indicator.

Figure 2, is a vertical transverse section taken on line 2—2, Fig. 1.

Figure 3, is a vertical section, on an enlarged scale taken on line 3—3, Fig. 1.

Figure 4, is a vertical longitudinal section of an automobile equipped with a modified form of my invention.

Figures 5 and 6 are vertical sections taken on the correspondingly numbered lines in Fig. 4.

Similar characters of reference indicate like parts in the several figures of the drawings.

Although the construction of the chassis of the automobile may be varied in order to adapt the same for use in connection with my invention that shown in the drawings comprises longitudinal side bars of which one is shown at 10, a spring support comprising a plurality of springs similar to the one shown at 11 which is arranged underneath the side bar and connected at opposite ends therewith, a transverse axle housing 12 mounted on the spring system, a transverse axle 13 journaled in the axle housing and wheels 14 mounted at opposite ends of the axle and each provided on its periphery with a pneumatic tire 15. In Figs. 1 and 2 it is assumed that the tire is in a normal inflated condition in which case the axle is raised above the ground line 16 so that the tire operates under normal conditions. My improved tire deflation indicator is designed to give a signal to the attendant when the tire has become deflated from any cause, and to give this signal before such deflation has extended to a point where the wheel would be running with its rim on the deflated or flattened tire. It is, therefore, assumed that this signal will operate when the tire has become deflated to such an extent that the axle and the car will be lowered to a point which will bring the ground approximately to a line indicated at 16ª relative to the axis of the wheel which line in the present case is a short distance radially outside of the wheel rim, as shown in Fig. 1.

In the form of my tire deflation the indicator represented in Figs. 1, 2 and 3 is constructed as follows:

In its general organization this tire deflation indicator comprises a support which is adapted to be mounted on the chassis of the car, a detector which is mounted on the support and adapted to be shifted by contact with the ground when the chassis is lowered to a predetermined extent by reason of deflation of a tire and a signalling mechanism which is responsive to the movement of the detector upon engaging the ground.

In the preferred form of the support the same comprises a horizontal base 17 which is adapted to be secured at its inner end to the axle housing and the spring by means of the same U-bolts 18 which connect the spring and axle housing, as shown in Fig. 1, a supporting arm 19 arranged horizontally and parallel with the base 17 but on one side of the latter, and a bow 20 connecting the outer ends of the base and arm. Upon the inner or free end of the arm 19 is mounted an electric switch which is adapted to control a signal in an electric circuit, this switch in the present instance consisting of a thick switch contact 21 mounted on the arm 19 but insulated therefrom and a movable switch contact 22 guided in a hanger 23 which is secured to the arm 19 so that the movable contact 22 may be raised into engagement with the fixed contact 21 or lowered out of engagement therewith for breaking the circuit. The movable contact is preferably held yieldingly out of engagement from the fixed contact by means of a spring 24 surrounding the stem 25 whereby this contact is guided on the hanger 23 and said spring bearing at its upper end against the upper side of the hanger 23 while its lower end bears against a collar or head 26 arranged at the lower end of the stem 25 as shown in Fig. 3. The two contacts 21 and 22 are connected with conducting wires 27, 28 which form part of an electric circuit including a battery or an electric generator 29 and a signal such as a lamp 30 which latter is preferably arranged at a point adjacent to the driver's seat so that the same will be observed when lighted or extinguished.

Raising of the movable contact 22 into engagement with the fixed contact is effected when the tire is deflated to a predetermined extent and beyond which further deflation might be dangerous and injure the tire. Such engagement of the movable contact with the fixed contact is effected by a detector which is connected with the movable contact and is adapted to engage with the surface of the ground or roadway over which the car is travelling. In the form of this detector shown in Figs. 1, 2 and 3 the same comprises a helical spring 31 which is arranged in an upright position adjacent to the pneumatic tire of the wheel and connected at its upper end with the head 26 which in effect forms part of the movable contact. This detector spring is sufficiently stiff so that when its lower end is raised by engagement with the ground such contact will cause the detector spring to raise the movable contact and close the switch of the signalling device. By reason of this detector being made in the form of a helical spring any further contraction of this spring after the contacts of the switch have been engaged will not injure the same inasmuch as the spring 31 will simply compress the requisite extent to avoid such injury. Owing to the resilience of this spring 31 the same upon engaging the ground and dragging over the same during a deflated condition of the tire will also simply deflect the lower end of the detector spring and aid in raising the movable contact in to its closed position without however injuring any of the parts. Such action will occur regardless of whether the car is moving forwardly or backwardly inasmuch as the detector spring is capable of deflection in any direction. Instead of engaging the lower edge of the detector spring 31 directly with the ground the same is provided with a shoe 32 which is adapted to engage the ground and take the wear. The spring itself is also preferably enclosed by a sheath 33 of pliable or flexible material such as canvas or woven tubing which latter is secured at its upper end to the head 26 and at its lower end to the shoe 32 whereby the spring is prevented from becoming loaded up with dirt and at the same time is free to expand and contract lengthwise and also to be deflected horizontally in all directions when coming into operation, this being possible owing to the pliable character of the sheath 33 which will accommodate itself to the varied positions of the detector spring without retarding the function of the same.

For the purpose of re-inforcing the detector spring and preventing undue lateral deflection of the same which otherwise might possibly cause injury thereof a tubular guard is provided which surrounds the upper part of the detector and is secured at its upper end to the hanger 23 which forms a guide for the movable contact and is connected with the arm 19 of the supporting bracket. In its preferred construction this tubular guard contains a core 34 of spring wire and the body 35 of rubber treated fabric which together forms a tubular guard of sufficient resilience to give way when the detector is deflected but at the same time retards such movement of the deflector and is also free from liability to be effected by the weather.

In Fig. 1 the detector and the parts associated therewith are represented by full lines in the position which these parts occupy when the tire is fully inflated at which time the lower end of the detector is raised above the ground such a distance as will permit the tire to flatten a moderate extent under varied riding conditions without operating the signal. If, however, the tire should become deflated an abnormal extent and the ground line be brought to the point indicated at 16$^a$ then the lower end of the detector upon engaging the ground will cause the movable contact 22 to be engaged with the fixed contact 21 whereby the electric circuit will be closed and the lamp 30 lighted so that a signal will be given to the attendant that the deflation of the tire has reached a point which is dangerous and requires repair. If during such engagement of the detector with the ground the car is in motion then the detector in addition to being raised will also be deflected to one side of its normal position, as indicated by dotted lines in Fig. 1, thereby causing the electric signal switch to be closed without injuring the detector.

As soon as the tire is again inflated to its normal extent then the detector will be again projected downwardly into its fully extended position.

As shown in Figs. 1 and 2 the bracket or support is secured to the chassis of the car in such a position that the arm 19 of the bracket is arranged above the base 17 thereof which is satisfactory for cars employing wheels of comparatively small diameter. If, however, this detector is to be mounted on a car having wheels of comparatively large diameter the bracket or support may be reversed in a vertical direction so that the arm 19 instead of being above the base 17, as shown in Fig. 1, may be brought into position in which the arm 19 is below the base 17 as shown by dotted lines in Fig. 1. In such a reverse position the point of support of the detector and associate parts on the bracket will be lowered considerable and adapt the indicating mechanism for use on cars having wheels of larger diameter. The same device is therefore applicable to cars of varying diameters of wheels without requiring any change in construction. By arranging the arm of the bracket on one side of the base thereof the detector may be arranged on one side of the base and clear the same regardless of whether the bracket or support is positioned on the chassis for use on cars having either small or large wheels.

In order to prevent the detector from being operated during the winter time by engaging with snow or other obstructions which may be present on the roadway a deflector 36 is provided which is arranged in an upright position in front of the detector and associate parts and secured at its upper end by means of bolts 37 to the outer part of the bracket or the support, the latter being provided both on the outer end of its base and on the outer end of its arm with suitable openings for receiving the bolts 37 so that this deflector may be utilized for protecting the detector when the same is used either on a car having large wheels or one having small wheels.

In the modified form of my invention shown in Figs. 4–6, the fixed contact 38 of the electric switch is mounted on the under side of a base 39 which is fastened to the chassis of the car, and the movable contact 40 of this electric circuit is mounted on a vertical swinging spring bar 41 which is pivotally connected at one end by means of a horizontal pin 42 with the base bar 39 while its opposite end is provided with a hook 43 embracing the axle housing and its intermediate part is guided in a loop 44 which depends from the supporting bar
39. The detector in this instance comprises a helical spring 45 arranged in an upright position adjacent to the wheel having a pneumatic tire, and connected at its upper end with the spring bar 41, a shoe 46 having the form of a roller mounted on a frame 47 and connected with the lower end of the detector spring 45 and a resilient sheath 48 surrounding the detector spring 45 and connected at its upper end with the spring bar 41 and at its lower end with the shoe support 47, this sheath in the preferred construction consisting preferably of a body of rubber treated fabric and a helical core of spring wire similar to the tubular guard 34, 35.

In this modified construction the roller shoe 46 upon engaging the ground during a deflated condition of the tire will be raised relatively to the axis of the wheel, if the car is standing still and also deflected laterally in one direction or another if the car is in motion, thereby raising the movable contact 40 into engagement with the fixed contact 38 and thereby close the circuit which includes the battery 29 of the lamp 30 and thus notify the attendant that the tire requires reinflation in order to restore the same to its normal condition.

This tire deflation indicator is comparatively inexpensive in construction, it can be readily applied to various makes of cars without requiring special fittings for this purpose it operates reliably in giving a warning signal to the attendant that the tire is deflated to an abnormal extent, and the same has no delicate parts which are liable to get out of order by repeated use or when subjected to varying weather conditions.

If desired the detector spring may be used to the exclusion of the sheath and guard or either of them.

Obviously this signal mechanism can be mounted on the car adjacent to the front or the rear wheels, but preferably adjacent to each of these wheels.

In order to prevent the battery from running down in case a tire becomes flat while standing for a long time in the garage a switch 50 is provided in the electric circuit 20 so as to permit of opening the same when desired.

I claim as my invention:—

1. An electric switch having a fixed switch contact adapted to be mounted on a support and a movable contact guided on said support for vertical movement into and out of engagement with said fixed contact, and a detector connected with said movable contact and capable of longitudinal movement and also a lateral movement in all directions upon engaging the ground and comprising an upright spring connected at its upper end with said movable contact.

2. An electric switch having a fixed switch contact adapted to be mounted on a support and a movable contact guided on said support for movement into and out of engagement with said fixed contact, and a detector connected with said movable contact and capable of longitudinal and lateral movement upon engaging the ground and comprising an upright coil spring connected at its upper end with said movable contact and a pliable sheath surrounding said spring.

3. An electric switch having a fixed switch contact adapted to be mounted on a support and a movable contact guided on said support for movement into and out of engagement with said fixed contact, and a detector connected with said movable contact and capable of longitudinal and lateral movement upon engaging the ground and comprising an upright coil spring connected at its upper end with said movable contact, a pliable sheath surrounding said spring and having its upper end connected with the upper end of the same, and a shoe connecting the lower ends of said spring and sheath and adapted to engage the ground.

4. An electric switch having a fixed switch contact adapted to be mounted on a support and a movable contact guided on said support for movement into and out of engagement with said fixed contact, and a detector connected with said movable contact and capable of longitudinal and lateral movement upon engaging the ground and comprising an upright coil spring connected at its upper end with said movable contact and a flexible tubular guard surrounding the upper part of said spring and connected with said support.

5. An electric switch having a fixed switch contact adapted to be mounted on a support and a movable contact guided on said support for movement into and out of engagement with said fixed contact, and a detector connected with said movable contact and capable of longitudinal and lateral movement upon engaging the ground and comprising an upright coil spring connected at its upper end with said movable contact, a pliable sheath surrounding said spring and having its upper end connected with the upper end of the same, a shoe connecting the lower ends of said spring and sheath and adapted to engage the ground and a flexible tubular guard surrounding the upper part of said spring and connected with said support.

In testimony whereof I affix my signature.

FRANCIS G. CRONE.